Figure 1:
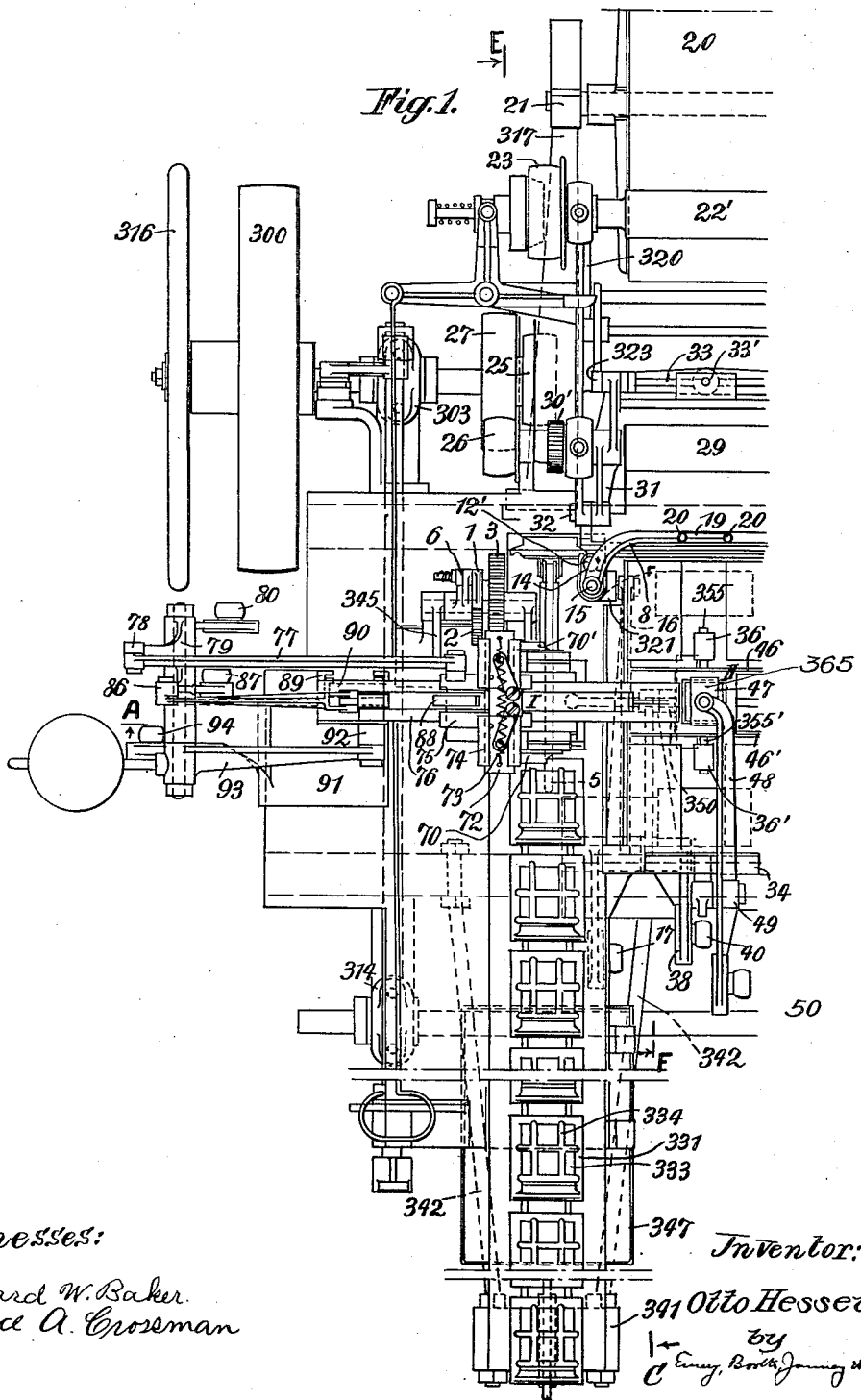
Figure 1A:
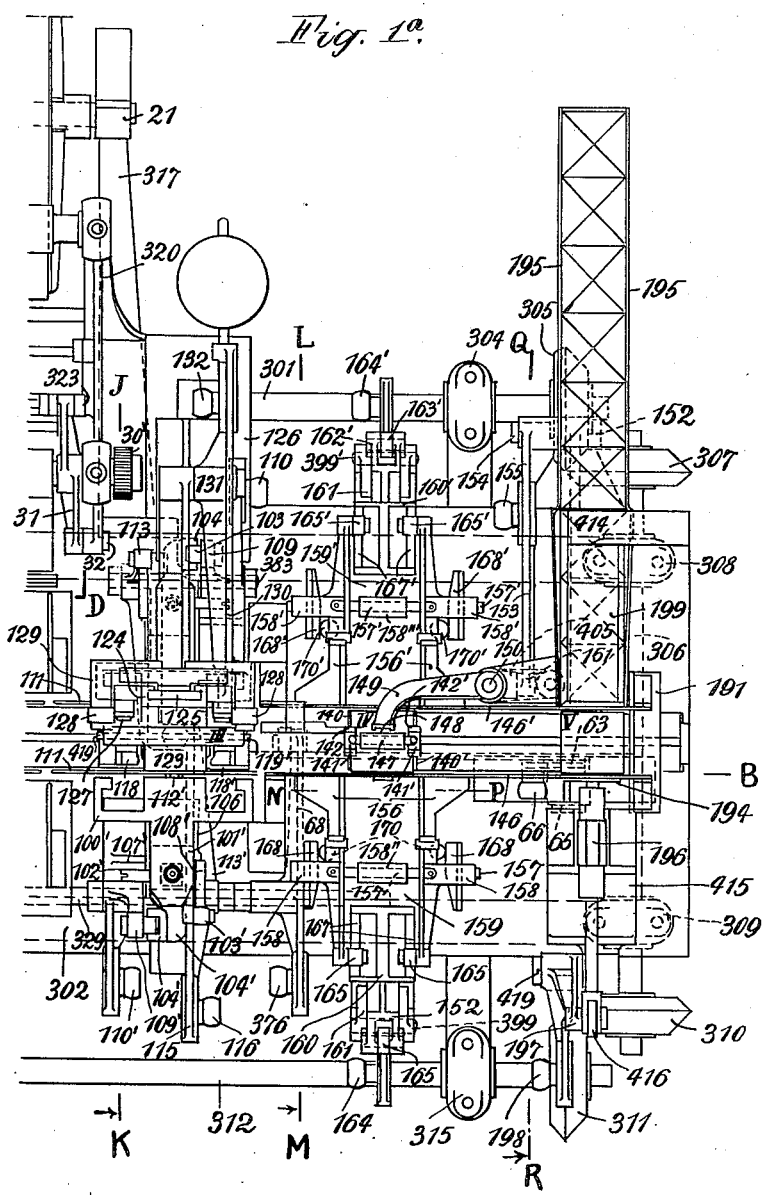

O. HESSER.
MACHINE FOR ENWRAPPING PIECES OF FATTY MATERIALS.
APPLICATION FILED JULY 20, 1914.

1,117,188.

Patented Nov. 17, 1914.
10 SHEETS—SHEET 1.

Witnesses:
Edward W. Baker.
Horace A. Crossman

Inventor:
Otto Hesser
by
Emery, Booth, Janney & Varney
Att'ys

O. HESSER.
MACHINE FOR ENWRAPPING PIECES OF FATTY MATERIALS.
APPLICATION FILED JULY 20, 1914.

1,117,188.

Patented Nov. 17, 1914.
10 SHEETS—SHEET 2.

Witnesses:
Edward W Baker.
Horace A. Groseman

Inventor:
Otto Hesser.
by Emery, Booth, Janney & Varney
Attys

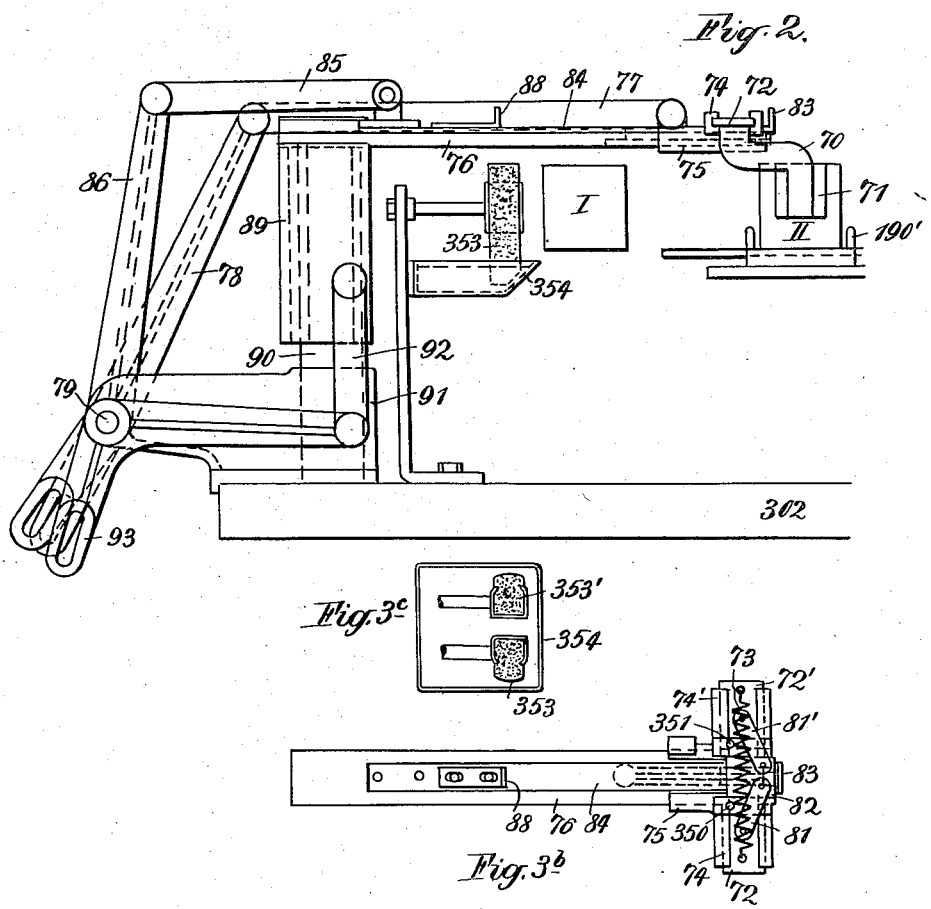

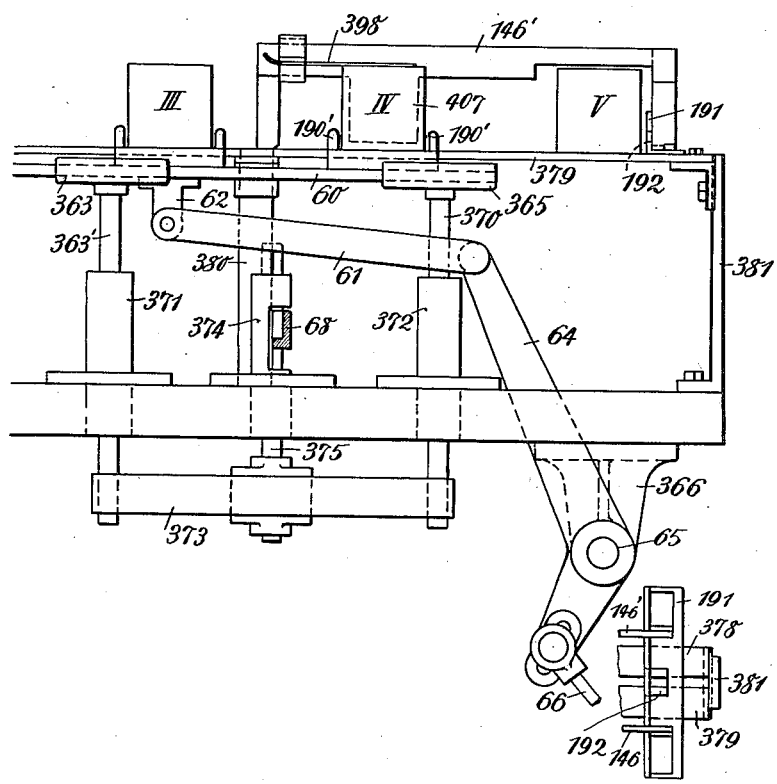

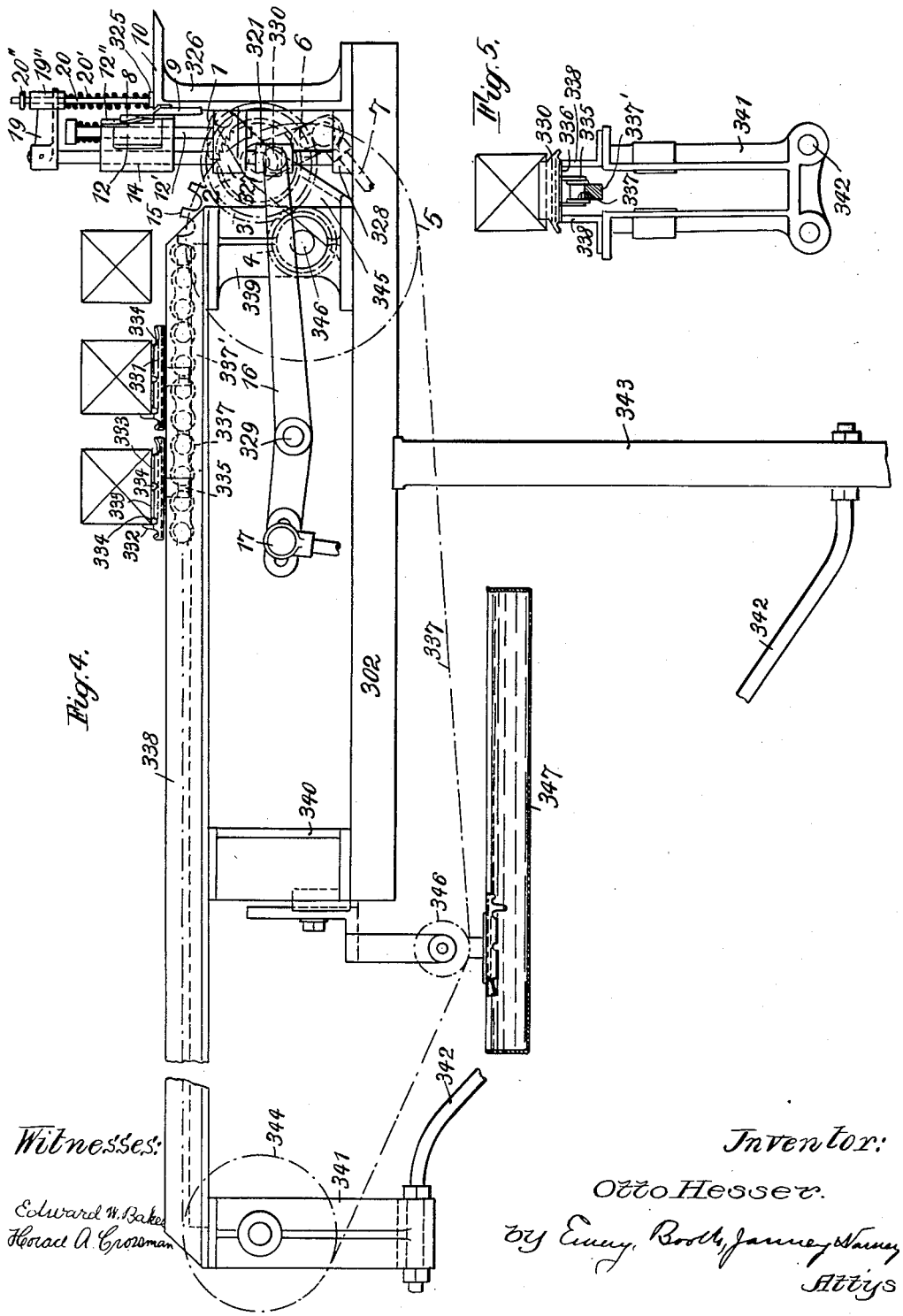

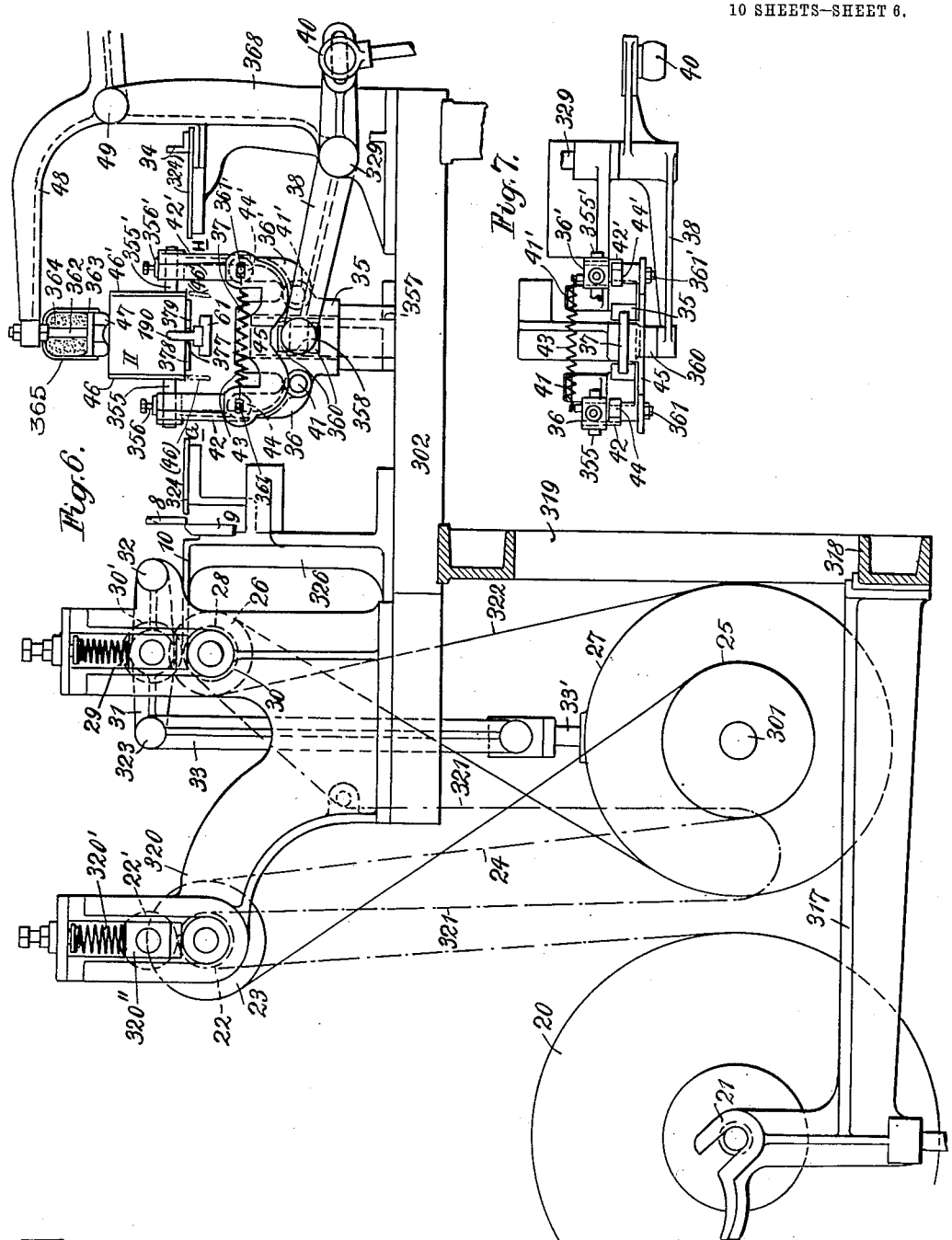

O. HESSER.
MACHINE FOR ENWRAPPING PIECES OF FATTY MATERIALS.
APPLICATION FILED JULY 20, 1914.
1,117,188.
Patented Nov. 17, 1914.
10 SHEETS—SHEET 7.
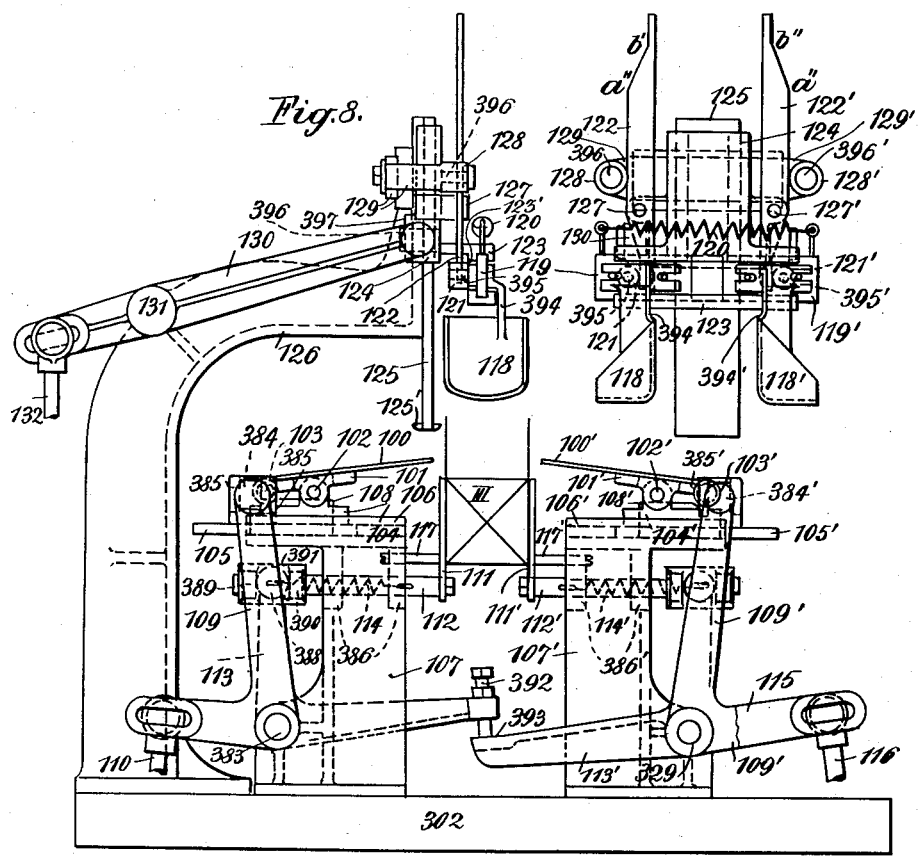
Witnesses:
Edward W. Baker
Horace A. Crossman
Inventor:
Otto Hesser
by Emery, Booth, Janney Varney
Attys O. HESSER.
MACHINE FOR ENWRAPPING PIECES OF FATTY MATERIALS.
APPLICATION FILED JULY 20, 1914.
1,117,188.
Patented Nov. 17, 1914.
10 SHEETS—SHEET 8.
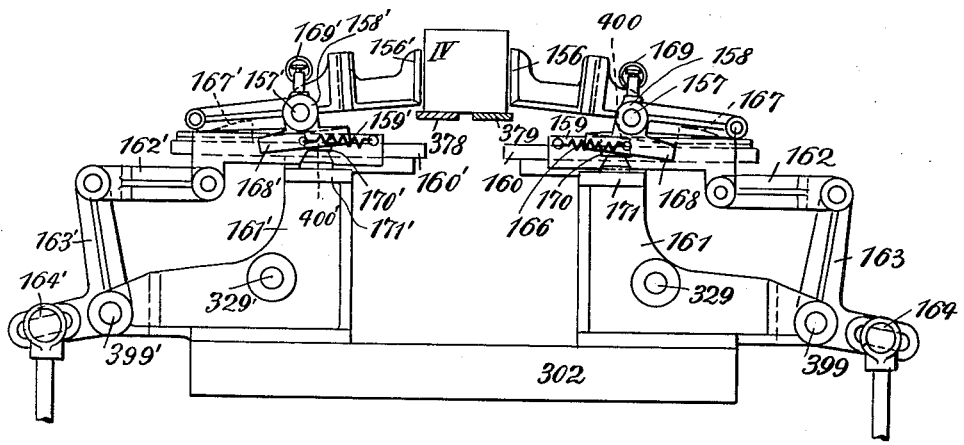
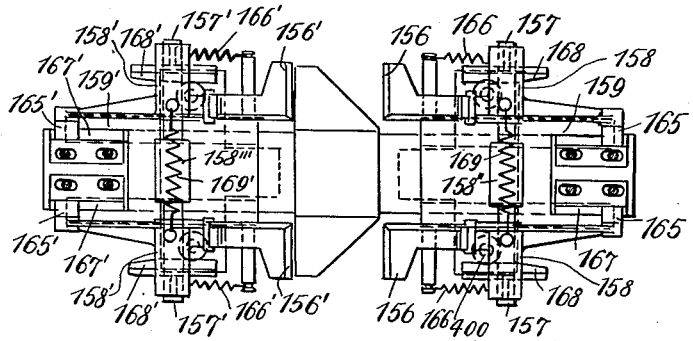
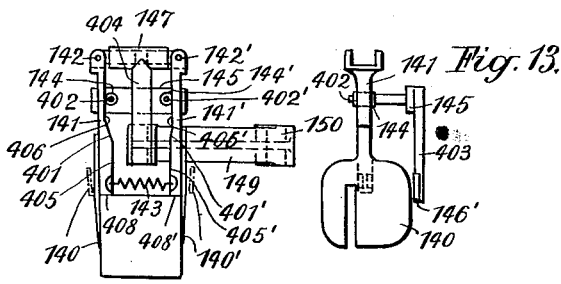
Witnesses:
Edward W. Baker.
Horace A. Crossman.
Inventor:
Otto Hesser.
by Emery, Booth, Janney & Varney
Attys O. HESSER.
MACHINE FOR ENWRAPPING PIECES OF FATTY MATERIALS.
APPLICATION FILED JULY 20, 1914.
1,117,188.
Patented Nov. 17, 1914.
10 SHEETS—SHEET 9.
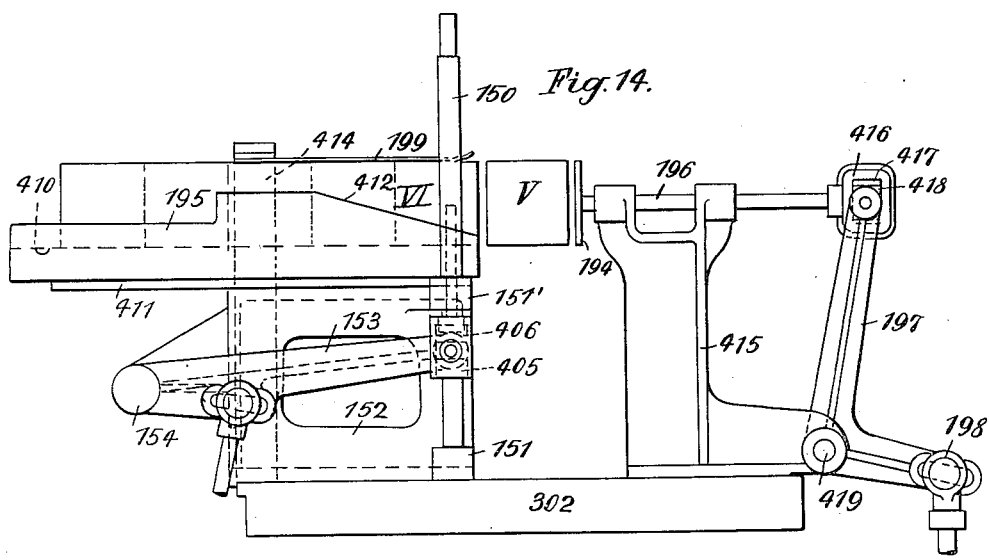
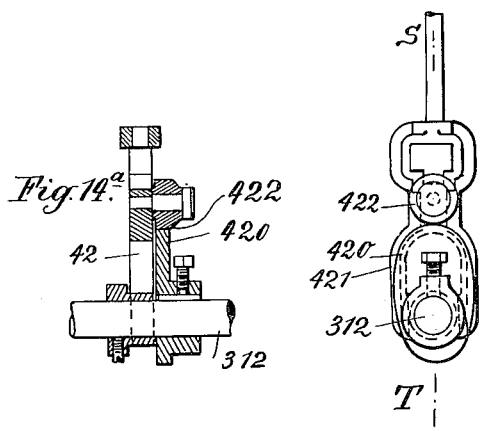
Witnesses:
Edward W. Baker.
Horace A. Croseman.
Inventor:
Otto Hesser.
By Emery, Booth, Janney Varney
Attys O. HESSER.
MACHINE FOR ENWRAPPING PIECES OF FATTY MATERIALS.
APPLICATION FILED JULY 20, 1914.
1,117,188.
Patented Nov. 17, 1914.
10 SHEETS—SHEET 10.
Fig. 15.
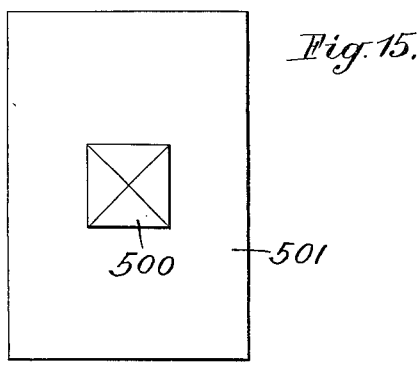
500   501
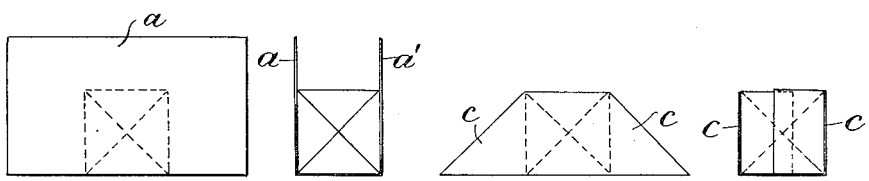
Fig. 16.   Fig. 18.
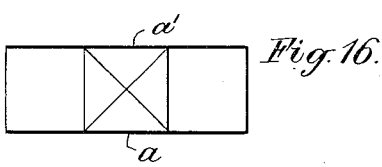 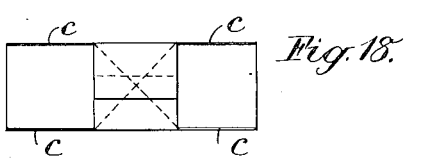
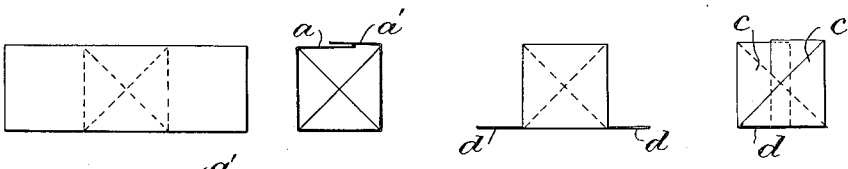
Fig. 17.   Fig. 19.
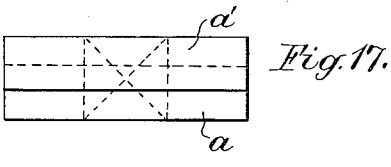 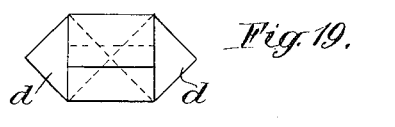
Witnesses:
Edward W. Baker,
Horace A. Crossman
Inventor:
Otto Hesser.
by Emery, Booth, Janney & Varney,
Attys

UNITED STATES PATENT OFFICE.

OTTO HESSER, OF CANNSTATT, NEAR STUTTGART, GERMANY, ASSIGNOR TO THE FIRM OF FR. HESSER MASCHINENFABRIK AKTIENGESELLSCHAFT, OF CANNSTATT, NEAR STUTTGART, GERMANY.

MACHINE FOR INWRAPPING PIECES OF FATTY MATERIALS.

1,117,188.  Specification of Letters Patent.  Patented Nov. 17, 1914.

Application filed July 20, 1914. Serial No. 851,900.

*To all whom it may concern:*

Be it known that I, OTTO HESSER, a subject of the German Emperor, and resident of Cannstatt, near Stuttgart, in the German Empire, have invented an Improved and Novel Machine for Inwrapping Pieces of Fatty Materials, of which the following is a specification.

This invention relates to a machine by which pieces of fatty materials, such as margarin butter, cheese and the like may be automatically inwrapped. Inwrapping such fatty materials is particularly difficult in consequence of the slight consistency of the same, the pieces being very liable to suffer changes of shape, the more, as materials of the kind in question are subject to the influences of temperature, weather, and the like. To overcome the drawbacks resulting from these causes, I lift the piece of material to be inwrapped by means of a pair of tongs, the cheeks of which are preferably moistened, off a feeding device which is formed by plates, preferably also moistened, and I let said tongs place the piece of fat upon the piece of paper into which said former piece is to be inwrapped. The paper is then turned into U-shape by bending upward those parts that lie transversely to the direction of feed and holding or pressing said parts against the respective sides of the piece of fat which is held in place during that time by means of a stamp, preferably also moistened; then, while those sides of the piece of fat that are situated transversely to the direction of feed are being appropriately re-shaped and supported, the upwardly projecting lateral parts of the paper and those upper parts of it which lie in the direction of feed in front of and behind the piece of fat, are folded, whereafter, while those sides of the piece of fat situated in front of and behind the said piece in the feed direction as well as those lying transversely to the feed direction are being appropriately re-shaped and supported, the lateral paper lugs located transversely to the direction of feed at the front and the rear end of the piece of fat may be folded inwardly, whereas the under ears that have remained in the feed direction at the front and at the rear of the piece of fat are bent or folded by shoving the piece of fat into the feed channel, as is all fully described hereinafter.

In order to make my invention more clear, I refer to the accompanying drawings which illustrate a machine according to my invention, as an example.

Figures 1 and 1ᵃ are the plan of the complete machine which is, as an example, designed to inwrap pieces of fat in the form of cubes; Figs. 2 and 2ᵃ are the front views of the feed device seen from line A—B of Fig. 1 and drawn in a larger scale; Figs. 3ᵃ, 3ᵇ, and 3ᶜ show details of Fig. 2 in plan; Fig. 4 is a representation of the cube conveying device seen from line C—D of Fig. 1; Fig. 5 shows the parts represented in Fig. 4 from the left side; Fig. 6 is a representation of the arrangement and combination of parts provided upon the station II and seen from the line E—F of Fig. 1; Fig. 7 shows a detail of Fig. 6 seen from line G—H of Fig. 6 in the direction to below; Fig. 8 is a representation of the parts provided upon the station III and seen from the line J—K of Fig. 1; Fig. 9 shows parts represented in Fig. 8 from the right hand side; Fig. 10 is a representation of the parts provided upon the station IV and seen from line L—M of Fig. 1; Fig. 11 is a plan of the parts shown in Fig. 10; Fig. 12 is a representation of a device provided upon the station IV and seen from line N—P of Fig. 1; Fig. 13 shows the parts of Fig. 12, seen from the right hand side; Fig. 14 is a representation of the parts of the station V seen from the line Q—R of Fig. 1; Fig. 14ᵃ is a cross section through the arrangement of the eccentrics in line S—T of Fig. 14; and Figs. 15-19 are representations of the successive folding stages occurring during the inwrapping of a cube, the parts concerned being shown in each stage in plan, from a side, and from right hand.

The various movable parts of the machine are driven by means of the pulley 300 keyed to the shaft 301 supported in bearings 303, 304, affixed to the plate 302. A bevel wheel 305 secured to said shaft is in gear with a bevel wheel 307 keyed to a shaft 306 supported in bearings 308, 309. A bevel wheel 310 affixed to this shaft is in gear with a bevel wheel 311 of a shaft 312 supported in bearings 314, 315 also affixed to the plate 302. If desired, all said shafts may be rotated by a hand wheel 316.

The inwrapping paper is held upon a roller 20 (Figs. 1 and 6) supported at 21 in brackets 317 affixed to a transverse girder 318 of the machine frame 319. The unwound paper is led to a pair of rollers 22, 22', of which the first is supported in brackets 320 and the other is guided in appropriate bearings 320" and is pressed against the other roller by a spring 320'. The roller 22 is driven by a pulley 23 which is furnished with a clutch, and by a crossed belt 24 connecting said pulley with another pulley 25 keyed to the shaft 301, the paper band being consequently continuously fed by the said rollers.

In order to intermittently feed the paper band in accordance with the wrapping blanks to be cut off, rollers 28, 29 are provided, of which the first is rotatably supported in the bracket 320 and is turned by means of the pulley 26, the crossed belt 322, the pulley 27, and the shaft 301. The upper roller is supported in levers 31 supported in their turn, at 32, in brackets 320 and being connected at their free ends 323 with a fork-shaped lever 33 moved up and down by means of an eccentric rod 33' and an eccentric also affixed to the shaft 301. The respective shafts of the two rollers in question are provided with cog-wheels 30, 30' which come in gear with each other when the fork 33 is in its lower position, whereas they are out of engagement in the other position of said fork. Simultaneously with the cog-wheels 30, 30' also the rollers 28, 29 come out of contact. The eccentric for actuating the fork 33 is so devised that the contact of the rollers 28 and 29 and thus the movement of the paper lasts so long that as much paper is fed as is necessary for inwrapping another cube. Then the fork 33 is raised and thereby the cog-wheels 30, 30' and the rollers 28, 29 come out of gear or contact. 34 is an angular abutment piece for the paper, serving to make it occupy the proper position. A rail 325 (Fig. 4), now moved down upon the paper, presses this latter elastically against the upper surface 10 of the bracket 326 affixed to the plate 302. Said rail is secured to bars 20 which may be moved up and down in an arm 19 and is normally as far pressed down by springs 20' as to contact with the guide sleeves 19' of the arm 19. This arm is affixed to an arm 15 which is vertically movable at 327, 328 in the bracket 326 and is operated by a lever 16 coupled with said arm by a slide 330 and a link 331. The lever 16 is supported by a shaft 329 and is actuated from an eccentric of the shaft 312 by means of the eccentric rod 17. At the same time, when the rod 15 gets down, also the cutting-off knife 8 is lowered, but in such a manner that first the rail 325 presses the paper elastically against the abutment 10, after which the knife in question passes along the counter knife 9 affixed to the bracket 326. The knife 8 is attached to a hinge 12 attached in its turn to a bolt 12' held in a fork 14 secured to the bar 15. Said hinge is connected with a spring 12" in such a manner that the movable knife 8 is elastically pressed against the stationary one 9. After the piece of paper or the blank has been cut off, the rod 15 is upwardly moved so that the knife 8 comes out of contact with the knife 9 and the rail 325 leaves the paper. There is now on the station I a readily cut piece of paper suited to receive a piece of the material to be inwrapped. These pieces, or cubes respectively, are conveyed to the inwrapping place by aid of plates 331 (Fig. 4) consisting of wood, china, glass, or the like, and each plate is provided at its rear end with a longitudinal rib 332 serving to take the respective cube with it; there are, further, raised parts 333 and groove-like cavities 334; and other plates 336 provided each with a lug 335 serve to connect the first-mentioned plates with a roll chain 337 as shown in Figs. 1 and 4. To support the plates laterally, angular longitudinals 338 are provided which are attached to brackets 339, 340, 341. The first two of these brackets are affixed to the machine table 302; the third bracket is connected by bars 342 with the frame 343 of the machine. The chain 337 rolls upon the rail 337', passes around the chain wheels 5 and 344 and is intermittently moved for such ways as necessary for the purpose in view. The device for thus operating the chain consists of a ratchet wheel 2 supported in a bracket 345 affixed to the machine table, and of a pawl 1 carried by toggle-lever 6 loosely fulcrumed upon the shaft of said wheel; this wheel is intermittently rotated by said pawl according to the oscillations of the toggle-lever which is oscillated by an eccentric affixed to the shaft 312 and by an eccentric rod 7 operated by said eccentric and operating in its turn the said lever. The step-by-step motion of the ratchet wheel 2 is transmitted to the shaft 346 of the chain wheel 5 by means of the cog wheel 4. The chain 337 is further led over a guide wheel 346 which may be adjusted in height at the bracket 340, and said guide wheel is arranged above a water vessel 347 in such a manner that the plates 331 are made to pass through the water within said vessel in order to be moistened, as already mentioned in the preamble.

When the cube has been transported, in the manner described, to the station, I, it is conveyed by a tong-like device to the station II where it is deposited upon the piece of paper previously cut off. The tong employed for this purpose (Figs. 1, 2, 3$^b$) consists of the wooden cheeks 71, 71' which are affixed to two separated rails 72, 72'. A spring 73 draws these rails one against the other. They are guided in guide ways 74, 74' provided in a slide 75. They are further movably connected by hinges 81, 81′ with a slide 82 which may be moved to and fro upon a rail 84 which also in its turn may be moved along upon a rail 76 attached to a slide 89 adapted to be vertically moved at a rail 90 affixed to a bracket 91. The to-and-fro motion of the slide 75 is effected by the joint 77, the lever 78, which may be turned upon the shaft 79 supported in the bracket 91, further by the eccentric rod 80 and the appertaining eccentric keyed to the shaft 306. To move the rail 84 to and fro, a hinge 85 is provided, further a lever 86 supported upon the shaft 79, and an eccentric rod 87 which is also actuated from an eccentric of the shaft 306. The vertical movement of the slide 89 is effected by the hinge 92, the bell-crank lever 93 secured to the shaft 79, and the eccentric rod 94 which is operated from an eccentric keyed to the shaft 306.

The manner of operation is as follows: In the same moment in which a cube is transferred from the station I to the station II, i. e. upon the piece of paper there present by means of the tongs 71 71′, the parts in question are in the position shown in Figs. 2 and 3ᵇ, that is to say, the rails 72, 72′ are being drawn one against the other so that the cheeks of the tongs are still in contact with the cube. Now the rail 84 is moved to the left by the mechanism described, and the front abutment 83 of the rail 84 pushes upon the slide 82 and presses it to the left until the arms 81 and 81′ contact with the abutments 350, 351, after which the rails 72 and 72′ are moved away one from the other by a spring 73 and by the toggle-lever action. The rail 84 now comes to a standstill. By the outward movement of the rails 72, the cheeks 71, 71′ have let loose the cube. Now the slide 75 with its open cheeks 71, 71′ is moved to the left by the mechanism described until said cheeks pass along at the sponges 353, 353′ (Figs. 2 and 3ᶜ) which dip into a vessel 354 containing water, the cheeks being now moistened by the wet sponges. The slide 75 is now moved to the right until the cheeks 71, 71′ arrive at the station I, where the further forward movement of the slide is interrupted. The rail 84 is then, by the mechanism described, shoved to the right for such a way that its abutment 88 pushes from the left against the slide 82 moving this to the right, for such a way, that now the rails 72, 72′ may again be drawn against one another by the spring 73, the rail 84 coming finally to a standstill. By reason of the inward movement of the rails 72, 72′, also the cheeks 71, 71′ therewith connected are moved inward and grasp the cube present at the station I at two sides. After this, the rail 76 with the slide 75 and thus also the cheeks 71, 71′ with the cube are raised by means of the slide 89 and the appertaining mechanism, and the slide 75 is moved also by its appertaining mechanism, from the position shown in Fig. 1 to that shown in Figs. 2 and 3ᵇ, viz. to the right, so that the cube in question arrives above the station II. Now the slide 75 is again lowered by the rail 76, the slide 89, and the appertaining mechanism of this latter, until the cube touches the piece of inwrapping paper intended for it, after which, by the left hand movement of the rail 84, the cheeks 71, 71′ are again opened by means of the abutment 83 and the cube 500 is deposited upon the paper 501 (Fig. 15).

At the station II (Figs. 1, 6, 7) the piece of inwrapping paper is bent or folded around the cube so as to be turned into U-shape and the legs of the U are pressed against the cube, as shown in Fig. 6. This is effected by two folding plates 46, 46′ arranged lengthwise with respect to the direction of feed; said plates are attached to upper eyes of arms 36, 36′ and may be laterally adjusted by means of bolts 355, 355′ and screws 356, 356′. The arms 36, 36′ are fulcrumed upon bolts 41, 41′ of a slide 35 which may be vertically moved upon a rail 37, affixed to the bracket 357, by means of a lever 38 that is connected with the slide 35 by means of a sliding block 358 and a link 360 and is fulcrumed upon an auxiliary shaft 329 and may be vertically moved from an eccentric of the shaft 312 by an eccentric rod 40. To the arms 36, 36′ are attached switches 42, 42′ with which said arms are kept coupled by means of a spring 43 and by the mediation of guide rolls 44, 44′. These rolls are supported by a holder 45 and may be laterally adjusted by means of bolts 361, 361′; said holder is affixed to the upper end of the rail 37. Above the station II is arranged a wooden stamp 47 which may be adjusted in height by a bolt 362 and is attached to a lever 48; above said stamp is arranged a sponge 364 that is kept wet and is held in place by metal bands 365 or the like; the stamp 47 is thus constantly moistened by that sponge. The lever 48 is supported at 49 in the bracket 368 and is oscillated from an eccentric of the shaft 312 by the rod 50. The operation of this arrangement is the following: When the cube has been deposited upon the piece of paper into which it is to be inwrapped (Fig. 15), the position of the lateral plates 46, 46′ is that indicated in Fig. 6 by the dotted lines below the paper. In this position the distance of the plates 46, 46′ from each other is considerably larger than the breadth of the cube. The slide 35 which, of course, has also been in that lower position is now raised by the means provided for that purpose and thus also the plates 46, 46′ are raised and are made to gradually approach the sides of the cube by the co-operation of the switches 42, 42′ and the guide rolls 44, 44', the distance between said plates being thus reduced to the breadth of the cube when the said plates have arrived in their upper end position. The folding operation proceeds thus in this way that the side parts of the paper are bent by and by around and against the cube until a U is formed, and at or near to their end position the plates in question are pressed against the respective sides of the cube. The side parts of the paper are thus made to adhere to the fatty material forming the cube, and this latter is at the same time re-shaped by said plates. Before the upward movement of the plates 46, 46', the stamp 47 has been moved down upon the cube in question by the means provided for that purpose, the cube being thus held fast during the folding and pressing of the piece of paper, as just described.

After in station II the paper has been placed around the cube in the manner described, the plates 46 and 46' are again lowered and the stamp 47 is raised, so that the cube may now be conveyed to the station III. Transporting the cube to the stations III, IV, V is effected by U-shaped grippers 190 (Figs. 1 and 2) affixed to a common rail 60 which may be moved to and fro in slide-like guides 363, 365 by means of brackets 62, a hinge 61, and the lever 64 that is supported by the pivot 65 carried by the bracket 366 and is oscillated by an eccentric rod 66 from an eccentric affixed to the shaft 306. The slides 363, 366 are secured to slides 363', 370 which are vertically moved through sleeves 371, 372 secured to the machine table and which are connected at their lower ends with a rail 373 which in its turn is connected with a rod 375 vertically guided in the appropriately recessed sleeve 374. Moving the rail 373 and thus also the bars 363' and 370 is effected by a lever 68 (Fig. 1) carried by the shaft 329 and being oscillated by means of an eccentric rod 376 from an eccentric of the shaft 312. The double mechanism just described is thus capable of moving the rail 60 with the grippers 190 vertically as well as horizontally. The grippers 190' are moved in a longitudinal slot 377 (Fig. 6) between two plates 378, 379 supporting the cubes and which are supported in their turn by the standards 380, 381 carried by the table 302. The cubes are thus moved forward in this way that the grippers 190' take hold of the cubes from below, shove them to the next station, get down, and move back for the same length of way, when they again rise to grasp another cube from below.

At the station III (Figs. 1, 8, 9) the parts a, a' of the U-shaped piece of paper which extend above the upper surface of the cube are bent inward down upon this surface (Fig. 17). This is effected by folding plates 100, 100' which are secured to rockers 101, 101' carried by bolts 102, 102' of brackets 104, 104'; said rockers are kept coupled with switches 108, 108' by means of rollers 103, 103'; said switches are attached to brackets 107, 107'. The brackets 104, 104' are affixed to brackets 105, 105' which may be displaced in guide ways 106, 106' of the brackets 107, 107'. Moving the slides 104, 104', as well as the folding plates 100, 100' to and fro is effected by levers 109, 109' carried upon bolts 383, 329 supported in the brackets 107, 107'; said levers are provided with rotary glide blocks 384, 384' coöperating with links 385, 385' situated in the slides 104, 104' and actuated by eccentric rods 110, 110' from eccentrics affixed to the shafts 301, 312. There are further provided upon the station III lateral plates 111, 111' extending in the direction of feed and attached to bars 112, 112' guided at 386, 386' in the brackets 107, 107'. Pins 117, 117' prevent a rotary movement of said levers. To reciprocate the bar 112, a toggle-lever 113 is provided which is carried by the bolt 383 of the bracket 107 and takes with its circular head 388 between abutments 389, 390 of a sleeve 391 carried by the bar 112 and which is held by a spring 114 and an adjusting screw 392 in contact with a bearing surface 393 of a lever 113' which is fulcrumed upon a shaft 329 and is rocked by the mediation of its extension 115 and an eccentric rod 116 from an eccentric keyed to the shaft 312. For the rest, the lever 113', like the lever 113, coöperates with the bar 112', the guide roll of the bar 116 being held in contact with said eccentric by means of the spring 114. The plates 111, 111' are thus simultaneously actuated by the rod 116. There are, furthermore, arranged on the station III the head folders 118, 118' which are affixed to separate rails 119, 119' by means of arms 394, 394' in such a manner that they may be laterally adjusted; said arms may be displaced in a slide 123. Bolts 395, 395' extend through longitudinal slots provided in the rear surface of the slide 123; said bolts are carried by the rails 119, 119' and they carry in their turn rolls 121, 121' by means of which said rails are held coupled with switches 122, 122' that may rotate upon bolts 127, 127' of a slide 124 to which is attached also the slide-like guide 123. The switches 122, 122' are held in contact, by a spring 120, and above the pivots 127, 127', with rolls 128, 128' located upon bolts 396, 396' carried in brackets 129, 129' which may be laterally adjusted in the bracket 126. The slide 124 is guided at the rail 125 which is affixed to the bracket 126 and provided with an oil guard 125', and it is vertically moved by a lever 130 having a glide block 396 coöperating with a link 397 of the slide 124; said lever is supported by a bolt 131 of the bracket 126 and is oscillated by an eccentric rod 132 from an eccentric affixed to the shaft 301.

The manner of operation of this device is as follows: When the cube with the U-shaped piece of paper (Fig. 16) arrives at the station III, the side plates 111, 111' which up to then were in a receded position are pressed by the springs 114, 114' against the respective sides of the cube (Fig. 8) by reason of the appropriate configuration of the eccentric operating the rod 116. Now the folding slides 100, 100' are moved inward by the mechanism before described, and at the same time they are rotated by the switches 108, 108' and the guide rolls 103, 103'. Owing thereto, the upwardly projecting side parts *a*, *a'* of the U-shaped pieces of paper are bent down upon the cube (Fig. 17) so that the paper now appears in the form of a hose of rectangular section. The side plates 111, 111' are now moved back by the described mechanism provided for this purpose and the head folders 118, 118' are lowered which is effected by the slide 124 being moved downward at the rail 125 by means of the parts before described. Those surfaces of the switches 122, 122' which are in contact with the guide rolls 128, 128' are so dimensioned that the inner surfaces of the head folders 118, 118' are at first in a certain distance from the end surface of the cube. Only upon the way *a''—b''* (Fig. 9) of the switches 122, 122', the head folders 118, 118' are elastically pressed against the head surface of the cube. In the lower position of the folders 118, 118', the side plates 111, 111' are pressed inward a second time by means of the springs 114, 114', as already described. By this means, a sharp break is produced in the closing folds pressed in between the plates 111, 111', and the side surfaces of the head folders 118, 118', and further the cube which is pressed in, at its head ends, between the head surfaces of the folders 118, 118' and, at its lateral sides, between the plates 111, 111' is re-shaped. After this, the folders 118, 118' are again raised to the position shown in Fig. 8 and the side plates 111, 111' are laterally drawn off the cube. The shape of the piece of inwrapping paper is now that shown in Fig. 18. The so far inwrapped cube is now conveyed to the station IV. Side plates 146, 146' (Figs. 1 and 2) provided between the stations III and V guide the cube on this part of its path and prevent unfolding of the folded lateral paper parts; said plates may be laterally adjusted corresponding to the breadth of the cube. Another plate, 398, attached to one of said side plates prevents the upper part of the folded paper from unfolding while the cube is moved from the station III to the station IV; said plate 398 may be adjusted, if desired, in such a manner that it presses the paper part in question a second time against the upper surface of the cube.

On the station IV (Figs. 1, 10—13), the lateral ears *c* (Fig. 18) are folded inward (Fig. 19) which is effected by two pairs of folding bodies 156, 156'. It will be sufficient to describe one of these pairs, for instance the lefthand one. The folding bodies 156, 156' which are situated on the two sides of the feed device may be rotated, as well as laterally displaced, upon bolts 157, 157' which are fastened in eyes 158, 158' of slides 159, 159'. These slides are longitudinally guided in rails 160, 160' affixed to standards 161, 161'. The reciprocating movement of the slides 159, 159' is effected by the mediation of forked hinges 162, 162' by means of toggle-levers 163, 163' which are fulcrumed to bolts 399, 399' secured to brackets 161, 161', and are operated by eccentric rods 164, 164' from eccentrics of the shafts 312 and 301. The rocking folders 156, 156' are, at their rear ends, provided with rolls 165, 165' held by means of springs 166, 166' in engagement with switches 167, 167' which are secured to the sides of the rails 160, 160'; said springs are secured at the one end to the slides 159, 159' and at the other end to downwardly extending lugs 168, 168' of the eyes 158, 158'. The extensions 168, 168' form, at their inner sides, also switches and are held in engagement, by springs 169, 169', with rolls 170, 170' that may rotate upon bolts 400, 400' of brackets 171, 171' of the standards 161, 161'. Above the station IV, relatively thin sheet metal plates 140, 140' that may be raised and lowered, as well as turned inward and outward, are arranged transversely to the direction of feed (Figs. 1, 12, 13). For this purpose, the plates 140, 140' are affixed to arms 141, 141' which may be turned, at 142 and 142', on a cross-piece 147. The arms 141, 141' are so shaped at their inner sides as to form switches 401, 401' which are held in engagement, by a spring 143, with guide rolls 144, 144' carried by bolts 402, 402' affixed to a cross piece 145 secured in its turn to the lateral guide rail 146' by means of the connecting piece 403. The cross piece 147 is connected by the arm 404 with an arm 149 (Figs. 1 and 12) secured to a bar 150. A link-like piece 405 is affixed to the bar 150 in the manner shown in Figs. 1 and 14, and the slot of said link contains a glide block 406 movably connected with the lever 153 which is carried by the bolt 154 of the bracket 152 and is rocked by an eccentric rod 155 from an eccentric of the shaft 301.

The manner of operation of the parts forming the station IV is as follows: After the cube with the paper folded according to Fig. 18 has arrived on the station IV, the sheet metal plates 140, 140' are moved down from their upper position shown in Fig. 12 in dotted lines. As in that upper position of said plates the parts 505, 505' of the arms 141, 141' are in engagement with the rolls 144, 144', the plates 140, 140' are in a greater distance one from the other than corresponds to the length of the cube. Owing to the fact that, on the arms being lowered, their surfaces 401, 401' and 505, 506' contact successively with the rolls 144, 144', also said plates are moved inward so that they, when in their lower position (Fig. 12), are laid tightly against the paper covering the head sides of the cube and press the paper already for a certain length of way before from above against said sides of the cube. As also the lateral guide rails 146, 146' are provided at both sides with elongations 407 extending downward at both sides of the station IV (Fig. 2), the cube is inclosed at all its four sides, its proper shape being maintained in this manner. As seen from Fig. 12, in the lower position of the plates 140, 140', the lower surfaces 408, 408' of the arms 141, 141' are laid from above upon the rims of the paper so that also in this way unfolding of the same is prevented. While the sheet metal plates 140, 140' remain in their lower position, the side folders 156 are being moved inward by the mechanism before described. As shown in Fig. 11, the folders 156 are, in their extreme end position, more distant from one another than corresponds to the breadth of the cube. Owing to the fact that the switches 168 of the folding bodies being advanced pass away gradually over the rolls 170, the folding bodies in question are made to approach each other when being moved inward so that the bent or folded paper is sharply pressed against the plates 140, 140' whereby a sharp break is produced. At the same time, the folding bodies are lowered by means of the rolls 165 coming in gear with the switches 167 so that also the under lugs d (Fig. 19) are tightly pressed against the rails 378, 379 whereby also here a sharp break is produced. After the folding bodies 156 have been drawn back, the folding bodies 156' are made to advance by the mechanism provided for this purpose and they are moved by the coöperation of the switches 168' with the guide rolls 170', as well as by the coöperation of the guide rolls 165' with the switches 167', in such a manner, that, during the forward movement thus effected, they move inward, as well as downward, viz. from the position shown in Figs. 10 and 11, so that the folded lugs are pressed laterally against the sheet metal plates 140, 140', as well as downward against the rails 378, 379, whereby again sharp breaks are produced. After the folding bodies 156' have been drawn back, the plates 140, 140' are again raised by the means therefor provided, and the cube the inwrapping paper of which has now the shape shown in Fig. 19, may then be conveyed to the station V. A preliminary folding of the ears d (Fig. 19) is effected during this advance movement by the U-shaped gripper 190' contacting with the front and rear edges of the cube, whereby the ears are bent upward by means of the lateral fingers of that gripper. The front one of the just folded ears d contacts on the station V with a rail 191 which is provided with a recess 192 (Figs. 2 and 3ª) allowing of the entrance of the front finger of the said gripper.

On the station V the cube is pushed into the conveying gutter, the bottom 410 of which is screwed at its front end to a plate 411 affixed to the standard 152. The lateral guide plates 195 of the conveying gutter are inclined at their front end, in the manner shown at 412 in Fig. 14, and above the entrance opening a horizontal rail 199 is affixed to a holder 414 secured to the machine table 302. The pushing out is effected by a stamp 194 attached to a bar 196 guided in the bracket 415. This bar is provided at its rear end with a link 416, in the slot 417 of which a glide block 418 revolubly connected with a lever 197 may be displaced. This lever is fulcrumed upon a bolt 419 secured to the standard 415 and is rocked by an eccentric rod 198 which is guided by a fork 421 from an eccentric 420 actuating said rod by the mediation of a roll 422. The manner of operation of this device is as follows: As soon as the cube has arrived on the station V, that is to say, while the ears d are still turned upward between the fingers of the gripper 190', the stamp 194 is made to advance to the left by the means provided for that purpose, and the cube is thus shoved off the gripper and to and between the sides 195 of the conveying gutter. Owing to the fact that the ears in question which have already been preliminarily folded pass along at the obliquely upward extending guide edges 412 they are finally and ultimately folded; the cube is held in place during this time by means of a plate 199 which at the same time presses the paper from above upon the cube. During the further way of the thus finished cube with its envelop, this latter can no more unfold owing to the guide parts 195 provided for this purpose. Finally, after the cube has been shoved into the position VI (Fig. 14), the stamp 194 is moved back by the means described to the right into the position represented in this figure.

Having now described my invention, what I desire to secure by a patent of the United States is:

1. In a machine for inwrapping pieces of fatty materials, the combination, with a plurality of working places and with means for conveying each piece to and away from each of said places in proper succession, of means for placing an inwrapping paper blank into the path of the pieces to be inwrapped, a feed device for these pieces, means for putting the piece next to be inwrapped from said feed device upon the paper blank, means for bending upward those projecting parts of the blank that lie transversely to the feed direction and pressing these parts against the respective sides of the piece of material, means for folding down upon the upper side of said piece the upwardly projecting parts of the blank, means for supporting parts of the blank, means for supporting those sides of the piece of material that lie transversely to the feed direction during said folding process, means for folding down the upper projecting parts of the blank which are situated at the front and rear end of the piece of material in the feed direction, means for re-shaping the sides of the piece of material located transversely to the feed direction after this folding process, means for folding inward the lateral lugs of the blank situated in the feed direction at the front and rear end of the piece of material, means for supporting and re-shaping the front, rear and lateral sides of said piece during this folding process, and means for folding inward the remaining under lugs of the blank at the rear and front end of the piece of material in the feed direction, substantially as described.

2. In a machine for inwrapping pieces of fatty materials, the combination, with a plurality of working places and with means for conveying each piece to and away from each of said places in proper succession, of means for placing an inwrapping paper blank into the path of the pieces to be inwrapped, a feed device for these pieces; a pair of tongs adapted to put the piece of material next to be inwrapped from said device upon the paper blank; a stamp adapted to hold fast this piece of material from above; means for moistening the lower surface of said stamp; means for turning the paper blank into U-shape by bending upward those parts that lie transversely to the direction of feed, and pressing these parts against the respective sides of said piece of material; and means for further bending the said paper blank against and over the other surfaces of the respective piece of material in the succession described and shown.

3. In a machine for inwrapping pieces of fatty materials, the combination, with a plurality of working places and with means for conveying each piece to and away from each of said places in proper succession, of means for placing an inwrapping paper blank into the path of the pieces to be inwrapped; a feed device for these pieces; a pair of tongs adapted to put the piece of material next to be inwrapped from said device upon the paper blank, and means for moistening the gripping surfaces of the tong cheeks after said piece of material has been deposited upon said paper blank; a stamp adapted to hold fast this piece of material from above; means for turning the paper blank into U-shape by bending upward those parts that lie transversely to the direction of feed, and pressing these parts against the respective sides of said piece of material; means for bending over upon the upper surface of the piece of material the upwardly projecting lugs of the paper; and means for finishing the inwrapping stages as described.

4. In a machine for inwrapping pieces of fatty materials, the combination, with a plurality of working places and with means for conveying each piece to and away from each of said places in proper succession, of means for placing an inwrapping paper blank into the path of the pieces to be inwrapped, a feed device for these pieces; two folding means adapted to bend the paper blank into U-shape, these means being adapted to be moved from below to above and to be approached one another during the last part of their path, the distance between them being at first larger than the breadth of the piece of material to be inwrapped and finally equal to it; means for bending over upon the upper surface of the piece of material the upwardly projecting lugs of the paper blank; means for folding inward the corner parts of the laterally projecting paper lugs; and means for finishing the inwrapping operation as described.

5. In a machine for inwrapping pieces of fatty materials, the combination, with a plurality of working places and with means for conveying each piece to and away from each of said places in proper succession, of means for placing an inwrapping paper blank into the path of the pieces to be inwrapped, a feed device for these pieces; means for turning the paper blank into U-shape by bending upward those parts that lie transversely to the direction of feed, and pressing these parts against the respective sides of said piece of material; means for bending over upon the upper surface of the piece of material the upwardly projecting lugs of the paper blank; plates adapted to be placed against the sides of the piece of material before said lugs are bent down and to recede from this piece while the paper parts in front and behind the said piece are being bent, and to return into the former position for re-shaping the respective sides of the piece after this inwrapping operation; and means for bending also the remaining paper lugs against the respective sides of the piece of material, substantially as described.

6. In a machine for inwrapping pieces of fatty materials, the combination, with a plurality of working places and with means for conveying each piece to and away from each of said places in proper succession, of means for placing an inwrapping paper blank in place; a feed device for the pieces to be inwrapped; means for turning the cut-off piece of paper into U-shape by bending upward those parts that lie transversely to the direction of feed, and pressing these parts against the respective sides of said piece of material; means for bending over upon the upper surface of the piece of material the upwardly projecting lugs of the paper; plates adapted to be placed against the sides of the cubical piece before said lugs are upwardly bent and to recede from this piece while the paper parts in front and behind the said piece are being bent, and to return into the former position after this inwrapping operation for re-shaping the said piece; head folders adapted to coöperate with said plates in re-shaping the cube; and means for bending also the remaining paper lugs against the respective sides of the piece of material, substantially as described.

7. In a machine for inwrapping pieces of fatty materials, the combination, with a plurality of working places and with means for conveying each piece to and away from each of said places in proper succession, of means for placing an inwrapping paper blank in place; a feed device for the pieces to be inwrapped; means for turning the cut-off piece of paper into U-shape by bending upward those parts that lie transversely to the direction of feed, and pressing these parts against the respective sides of said piece of material; means for bending over upon the upper surface of the piece of material the upwardly projecting lugs of the paper; plates adapted to be placed against the sides of the cubical piece before said lugs are upwardly bent and to recede from this piece while the paper parts in front and behind the said piece are being bent, and to return into the former position after this inwrapping operation for re-shaping the said piece; head folders adapted to coöperate with said plates in re-shaping the cube; a lever adapted to move one of said plates and a lever adapted to move the other plate and yieldingly resting by means of an adjusting screw on the aforesaid lever; means for bending also the remaining paper lugs against the respective sides of the piece of material, substantially as described.

8. In a machine for inwrapping pieces of fatty materials, the combination, with a plurality of working places and with means for conveying each piece to and away from each of said places in proper succession, of means for placing an inwrapping paper in place; a feed device for the pieces to be inwrapped; means for turning the paper blank into U-shape by bending upward those parts that lie transversely to the direction of feed, and pressing these parts against the respective sides of said piece of material; means for bending over upon the upper surface of the cubical piece the upwardly projecting lugs of the paper; plates adapted to be placed against the sides of the piece of material before said lugs are bent down; head folders adapted to coöperate with said plates for re-shaping the piece; said head folders being adapted to be moved from above to below and to be approached one another during the last part of their path parallelly, the distance between them being at first larger than the breadth of the piece and finally equal to it, as shown and described.

9. In a machine for inwrapping pieces of fatty materials, the combination, with a plurality of working places and with means for conveying each piece to and away from each of said places in proper succession, of means for placing an inwrapping paper blank in place; a feed device for the pieces to be inwrapped; means for bending the piece of paper against and over the sides of the piece of material; plates adapted to be put against the front and rear end surfaces of said piece of material in the feed direction before the lateral paper lugs extending from the front and rear sides of the piece in the feed direction are folded and means for finishing the inwrapping operation as shown and described.

10. In a machine for inwrapping pieces of fatty materials, the combination, with a plurality of working places and with means for conveying each piece to and away from each of said places in proper succession, of means for placing an inwrapping paper blank in place; a feed device for the pieces to be inwrapped; means for bending the piece of paper against and over the sides of the piece of material; plates adapted to be put against the front and rear end surfaces of said piece of material in the feed direction before the lateral paper lugs extending from the front and rear sides of the piece in the feed direction are folded, fixed plates adapted to lie against the other side surfaces of the said piece, and means for finishing the inwrapping operation as shown and described.

11. In a machine for inwrapping pieces of fatty materials, the combination, with a plurality of working places and with means for conveying each piece to and away from each of said places in proper succession, of means for placing an inwrapping paper blank in place; a feed device for the pieces to be inwrapped; means for bending the piece of paper against and over the sides of the piece of material; plates adapted to be put against the front and rear frontal surface of said piece, in the feed direction, before the lateral paper lugs are bent; levers holding said plates; lateral projections forming parts of said levers, and being adapted to be placed from above upon the front and rear cube edge while said plates are in their lower position; and means for finishing the inwrapping operation as shown and described.

12. In a machine for inwrapping pieces of fatty materials, the combination, with a plurality of working places and with means for conveying each piece to and away from each of said places in proper succession, of means for placing an inwrapping paper blank in place; a feed device for the pieces to be inwrapped; folders for bending the paper piece into U-shape, laying the projecting paper parts upon the upper surface of the piece to be inwrapped, and folders for turning inward the corners of the laterally projecting parts; said latter folders being arranged not only to be rotated but also to be laterally displaced, and adapted to re-shape the respective sides of the piece of material and to press the remaining under lugs against a support; and means for finishing the inwrapping operation as shown and described.

13. In a machine for inwrapping pieces of fatty materials, the combination, with a plurality of working places and with means for conveying each piece to and away from each of said places in proper succession, of means for placing an inwrapping paper blank in place; a feed device for the pieces to be inwrapped; folders for bending the paper piece into U-shape, laying the projecting paper parts upon the upper surface of the piece to be inwrapped, and folders for turning inward the other projecting parts of the blank; upwardly extending fingers attached to the feed device and being adapted to preliminarily bend the remaining under lugs of the blank at the rear and front ends of the piece; said fingers being moved against the said paper parts from below; and means for bending also these remaining paper lugs against the respective sides of the piece of material, substantially as described.

14. In a machine for inwrapping pieces of fatty materials, the combination, with a plurality of working places and with means for conveying each piece to and away from each of said places in proper succession, of means for placing an inwrapping paper blank in place; a feed device for the pieces to be inwrapped; means for turning the paper blank into U-shape by bending upward those parts that lie transversely to the direction of feed, and pressing these parts against the respective sides of said piece of material; means for bending over upon the upper surface of the cubical piece the upwardly projecting lugs of the paper; means for folding inward the corner parts of the laterally projecting paper lugs; and means for bending also the remaining paper lugs against the respective sides of the piece of material; the means for folding the paper parts lying transversely to the direction of feed and those upper projecting parts of the blank lying parallel with said direction in front of and behind the piece of material being adapted to be adjusted in width corresponding to the respective dimension of the said piece, as set forth.

In testimony whereof I affix my signature in presence of two witnesses.

OTTO HESSER.

Witnesses:
FRIDA KLARBA,
ERNEST ENTENMANN.